No. 743,117. PATENTED NOV. 3, 1903.
C. L. VOTAW.
WHEEL.
APPLICATION FILED AUG. 8, 1903.
NO MODEL.
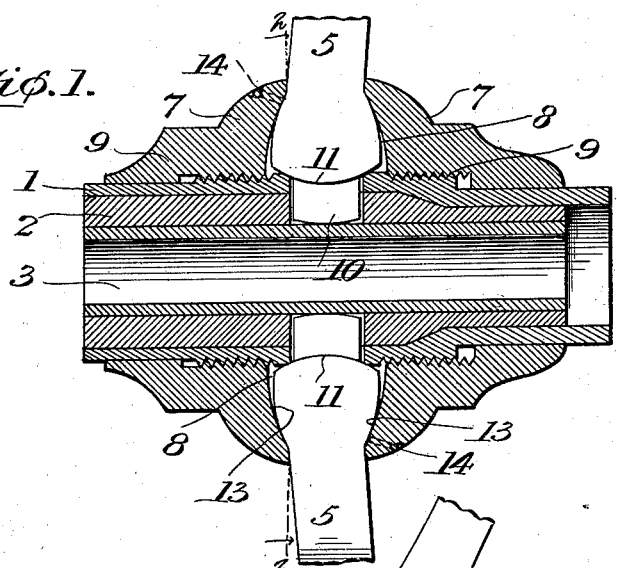
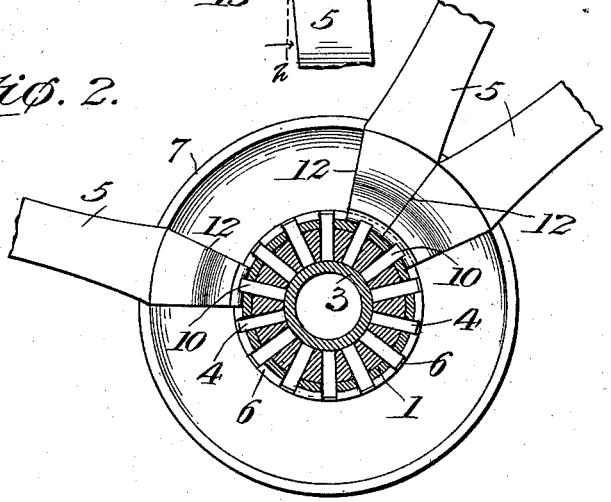
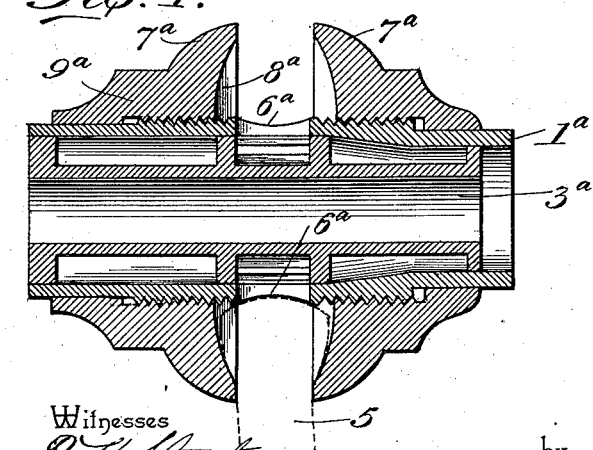
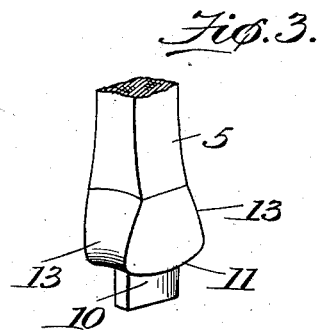
Witnesses
Charles L. Votaw, Inventor
Attorneys No. 743,117.

Patented November 3, 1903.

UNITED STATES PATENT OFFICE.

CHARLES LEROY VOTAW, OF TEMPLE, TEXAS.

WHEEL.

SPECIFICATION forming part of Letters Patent No. 743,117, dated November 3, 1903.

Application filed August 8, 1903. Serial No. 168,805. (No model.)

*To all whom it may concern:*

Be it known that I, CHARLES LEROY VOTAW, a citizen of the United States, residing at Temple, in the county of Bell and State of Texas, have invented a new and useful Wheel, of which the following is a specification.

This invention relates generally to wheels for vehicles and the like, and more especially to means for associating the spokes with the hub of the wheel.

The object of the invention is to provide in a wheel a peculiar form of hub and spoke, together with means for securing the spokes to the hub, whereby the "dish" of the wheel may be varied when it is desired to do so.

A further object of the invention is to provide an improved construction of wheel in which the parts are more readily assembled and disassembled than is usually the case and in which the spokes may be readily replaced when broken.

In the attainment of the objects above stated I make use of the construction and combination of parts of a wheel illustrated in the accompanying drawings, described in the following specification, and having the novel features thereof particularly pointed out in the appended claims.

In the drawings, Figure 1 is a longitudinal section through the hub of the wheel, showing portions of the spokes in position in the hub. Fig. 2 is a transverse section on line 2 in Fig. 1. Fig. 3 is a detail view in perspective of the end of a spoke for insertion in the hub as illustrated in Figs. 1 and 2. Fig. 4 is a longitudinal section through a modified form of the hub, the spoke being indicated in position therein by dotted lines.

In the drawings corresponding parts are designated by the same characters of reference throughout the various views.

Referring to the drawings by reference characters, 1 designates a sleeve of larger size at the inner than at the outer end, as shown. In the sleeve 1 is contained, preferably, the hub proper, 2, which is formed of wood and which fits accurately the interior of the sleeve 1.

3 designates the box in which the axle (not shown) is journaled.

The sleeve 1 is provided intermediate of its ends with a plurality of oblong slots 4, spaced equidistant and near together, for the reception of the tenons of spokes 5. On the outer surface of the sleeve, where the openings 4 are formed therein, there is provided a circumferential groove 6, the utility of which will afterward appear. On either side of the series of openings 4 the sleeve 1 is screw-threaded, as shown, and upon the screw-threaded portions are mounted clamping-plates 7, each of which has a slightly concave clamping-face 8 and an internally-threaded collar 9, which engages with the screw-threaded surface provided therefor on the sleeve 1. On the outside each of the screw-threaded collars 9 is made hexagonal or octagonal in form in order to provide a suitable surface for engagement with a suitable wrench for use in forcing the clamping-plates into operative position. The spokes 5 are of the usual form, except at the end associated with the hub, where each is provided with a tenon 10 and rounded shoulders 11 on opposite sides of the tenon, as shown. The rounded shoulders 11 correspond in curvature to the concavity of the groove 6, formed on the outer surface of the sleeve 1, and the tenons 10 fit without driving in the openings 4, provided in the sleeve. On either side of each spoke just beyond the rounded shoulders 11 are provided the inclined faces 12, which contact with corresponding faces upon the adjacent spokes and serve to prevent movement of the spokes laterally in the plane in which they lie. On the inner and outer faces thereof each spoke is provided just beyond the rounded shoulders 11 with bulges 13, over which fit the concavities of the clamping-plates 7, which hold the spokes in proper position in the sockets provided therefor in the sleeve 1.

In assembling the parts of the wheel the wooden hub 2 and the boxing 3 are secured within the sleeve 1 in the usual way. The spokes are then set in position in the openings provided therefor in the sleeve 1, and the tenons extend down into corresponding openings in the hub 2. The clamping-plates 7 are then screwed up on the threads provided on the sleeves 1 until they impinge against the inner and outer faces of the spokes with sufficient pressure to hold the spokes firmly in position at the desired inclination, thereby giving to the wheel any desired degree of dish. In order to hold the clamping-plates in position after they have been adjusted, a screw-hole 14 may be provided in each of said plates and a screw inserted therein to engage with the spoke adjacent to the end of the hole, thus effectively securing the clamping-plates in the desired position as long as the screw remains in engagement with the spoke.

If at any time it is desired to change the degree of dish of the wheel, the clamping-plates may be loosened and one of them screwed inward and the other one screwed outward upon the sleeve 1. This movement of the clamping-plates will of course change the inclination of the spokes to the sleeve in which they are inserted and produce a corresponding change in the dish of the wheel. The rounded shoulders provided on the spokes permit such movement of the spokes without causing the spokes to be forced outward from the sleeve, as they would be if the ordinary square shoulders were used.

In the preferred form of embodiment of the invention as described in the preceding paragraphs the wheel includes a wooden hub 2, which lies between the sleeve 1 and the boxing 3; but it is possible to do away with this wooden hub, if desired, and to fit the boxing directly to the interior of the sleeve 1, as illustrated in Fig. 4, in which 1$^a$ designates the sleeve, 3$^a$ the boxing, and 5$^a$ the spoke mounted in the sleeve 1$^a$.

The circumferential groove in the sleeve 1$^a$ is designated 6$^a$, and clamping-plates with dished clamping-faces 8$^a$ are shown mounted upon the sleeve 1$^a$, with the threaded surfaces of which the collars 9$^a$ of the clamping-plates 7$^a$ engage.

In both forms of the invention shown and described the engagement of the concave faces of the clamping-plates with the rounded bulges of the spokes forms means for holding the spokes securely in position in the hub without rivets to connect the plates, and the close contact of the marginal portions of the clamping-plates with the spokes on the surface beyond the bulges effectively prevents the entrance of moisture within the hub.

Having thus described the construction and operation of my invention, what I claim as new, and desire to secure by Letters Patent, is—

1. The combination in a wheel, of a sleeve having a circumferential groove on the outer surface thereof intermediate of its ends, a series of openings for receiving spoke-tenons formed in said groove, and extending through the wall of said sleeve, a plurality of spokes having tenons adapted to fit accurately within said openings, and rounded shoulders to conform to the concavity of said groove, and a pair of clamping-plates adjustably mounted upon said sleeve upon either side of said groove and adapted to engage with said spokes.

2. The combination in a wheel, of a sleeve having on the outer surface thereof intermediate of its ends a circumferential groove, a plurality of oblong openings for the reception of spoke-tenons arranged in said groove and disposed transversely thereof, screw-threads provided on either side of said groove, a pair of clamping-plates in threaded engagement with the threads upon said sleeve, and a plurality of spokes having tenons adapted to fit said oblong openings and rounded shoulders conforming to the concavity of said groove.

3. The combination in a wheel, of a sleeve of metal having intermediate of its ends a circumferential series of openings for receiving spoke-tenons, a wooden hub provided with a corresponding series of spoke-receiving openings and secured within said sleeve, a plurality of spokes having tenons adapted to enter the openings in said sleeve and in said hub, and a pair of clamping-plates adjustably mounted upon said sleeve and adapted to grip said spokes.

4. The combination in a wheel, of a sleeve having a circumferential series of openings adapted to receive spoke-tenons, a plurality of spokes having tenons adapted to fit said openings and provided on the inner and outer faces thereof with bulges adjacent to said tenons, a pair of clamping-plates having concave clamping-faces adapted to engage said bulges on said spokes, and means for holding said clamping-plates adjustably in engagement with said spokes.

5. The combination in a wheel, of a sleeve provided intermediate of its ends with a circumferential groove on the outer surface thereof, a plurality of openings adapted to receive spoke-tenons arranged in said groove and disposed transversely thereof, threads provided on said sleeve at either side of said groove, clamping-plates having concave clamping-faces threaded upon said sleeve upon either side of said groove, a plurality of spokes having tenons adapted to fit said openings in said sleeve, rounded shoulders conforming to the concavity of said groove, and bulges on their inner and outer faces adjacent to said tenons adapted to fit the concave clamping-faces of said plates.

In testimony that I claim the foregoing as my own I have hereto affixed my signature in the presence of two witnesses.

CHARLES LEROY VOTAW.

Witnesses:
JESSE H. MOYER,
S. D. PERKINSON.